March 12, 1940. J. G. ATTWOOD 2,193,706
METHOD AND APPARATUS FOR SEPARATING SOLID
MATERIALS FROM A LIQUID SUSPENSION
Filed Feb. 5, 1937 3 Sheets-Sheet 1

INVENTOR.
John G. Attwood.
BY
ATTORNEYS.

March 12, 1940.   J. G. ATTWOOD   2,193,706
METHOD AND APPARATUS FOR SEPARATING SOLID
MATERIALS FROM A LIQUID SUSPENSION
Filed Feb. 5, 1937   3 Sheets-Sheet 2

INVENTOR.
John G. Attwood.
BY Corbett & Mahoney
ATTORNEYS.

March 12, 1940.    J. G. ATTWOOD    2,193,706
METHOD AND APPARATUS FOR SEPARATING SOLID
MATERIALS FROM A LIQUID SUSPENSION
Filed Feb. 5, 1937     3 Sheets-Sheet 3

INVENTOR.
John G. Attwood.
BY
ATTORNEYS.

UNITED STATES PATENT OFFICE 2,193,706

METHOD AND APPARATUS FOR SEPARATING SOLID MATERIALS FROM A LIQUID SUSPENSION

John G. Attwood, Columbus, Ohio, assignor to Battelle Memorial Institute, Columbus, Ohio, a corporation of Ohio Application February 5, 1937, Serial No. 124,337

6 Claims. (Cl. 210—58)

My invention relates to a method and apparatus for separating solid materials from a liquid suspension. It has to do with that type of apparatus which is sometimes referred to as a thickener. My method and apparatus may be effectively used either for clarifying the liquid or concentrating the particles suspended therein or for both purposes.

In its simplest forms, a thickener may consist of a tank or merely a pond, with the liquid suspension entering the tank or pond at one end, depositing some or all of the suspended material as it passes through the tank or pond and overflowing at the opposite end in a relatively clarified condition. This type of thickener has the disadvantage of being intermittent. As usually operated, the feeding is continued until the overflow contains an undesirable amount of suspended material. Then, the operation of the device is interrupted to permit the removal of the thickened sludge.

Various mechanical devices have been utilized in an attempt to increase the efficiency of tank thickeners. One typical example of such mechanical devices comprises a shallow circular tank, a central feed well and a launder encircling the entire periphery of the tank for removing the overflow. The mechanism for removing the solids, in this type of device, consists of a set of slowly moving arms carrying plows. These arms travel in a rotary path about a central shaft and the plows continuously scrape the solids which settle on the bottom to the center of the tank, from which they are withdrawn by means of a spigot, pump or some such device.

This type of device, while retaining the advantages of the shallow tank, introduces the complication of moving parts. The plows and the supporting arms tend to stir up the settled solids and prevent their most effective concentration.

Another type of thickener that has been used in the prior art is sometimes referred to as a cone thickener. It is an adaptation of a simple tank which, however, is arranged for continuous operation. The bottom of the tank is built in the shape of a cone so that the solids which settle out are diverted to a central point, from which these solids may be withdrawn without interrupting the operation of the device.

This cone type of thickener has serious disadvantages which greatly limit its capacity. In cones which are required to handle large tonnages, it is necessary to make the tank so deep that a substantial part of the particles carried by the liquid must fall an undue distance before they settle out of the liquid. This depth is necessary in order that the sides shall be steep enough for the settled materials to slide readily to the center. Furthermore, this necessitates extremely heavy construction in the supports for the cone so as the required capacity increases, the cost of construction becomes prohibitive.

Several attempts have been made to increase the efficiency of tank thickener operations. One such attempt has involved the placing of inclined submerged baffles in a settling tank. Such baffles have certain advantages. For one thing, a solid particle does not have to sink as far as it does in an unbaffled tank, before it encounters a surface which effectively removes it from suspension.

Furthermore, when a cloud of particles is settling in a liquid, the actual thickening operation occurs primarily at the time some of these particles come into contact with a retarding surface. This action may be easily understood by considering the particles of solid matter which are settling in a body of liquid of relatively great depth. It will be noted that a cloud of particles far removed from the bottom thereof continues to settle as a cloud until it comes into the vicinity of the bottom or of some other surface which tends to retard or stop its downward movement. Thus, the final part of the thickening process consists of the squeezing out of the liquid from the interstices between the particles and, since the baffles increase the surface area through which this can take place, the efficiency of the thickener is increased.

While the baffles used in the prior art have certain advantages, they also have many disadvantages. For example, when a stream of liquid suspension impinges on the edge of a baffle, turbulence is set up which effectively hinders the separation. This turbulence cannot be avoided, as long as the stream flows across the edges of the baffles. At each point where this turbulence occurs, an eddy is induced which stirs up the suspension and, to some extent, destroys or defeats the work of separation.

The systems of baffles used in the prior art also involve cross currents which partially remix the products when an attempt is made to draw them off. The problem of introducing the suspension between the baffles and removing the liquid and solids separately without partially remixing them has not been effectively solved by the devices of the prior art.

Furthermore, the escape of the liquid is usually slow. Likewise, the flow of the liquid in a tank having baffles is not uniform so that the thickener contains large volumes of stagnant fluid which are wasted so far as effective separation of the solids is concerned. Parts of the thickener will contain masses of the suspension moving at velocities too high for efficient separation while other parts will contain fluid which is never removed from the thickener and which, therefore, contribute nothing to the operation.

In the prior patented art, there have been some proposals for the separation of suspended solids from liquids by what is generally referred to as vortex separation. One such suggested apparatus involved the use of a tank with a tangential inlet adjacent the top thereof and a tangential outlet adjacent the bottom thereof. This tank contained series of substantially horizontal helical strips with a well of relatively large diameter passing through the center thereof. Outlets were also provided in the top and bottom of this tank. In theory, the liquid suspension entered the tank tangentially adjacent the top and followed the helical passages to impart a strong vortical action to the liquid. The suspended material was said to collect at the center because of the fact that the central part of the liquid body would move more slowly. It was claimed that the light impurities tend to rise and are drawn off through the outlet in the top of the tank while the heavier impurities could be drawn off through the outlet in the bottom of the tank.

The extent of success of devices of this type is not known. However, this suggested device has certain obvious drawbacks. The violent motion of the material-laden liquid would substantially defeat any settling action. Moreover, the inflowing material-laden liquid would tend to disperse the particles passing upwardly for delivery from the top of the tank. Various other drawbacks are apparent, though they need not be enlarged upon here.

One of the objects of my invention is to increase the efficiency of a cone thickener so that a relatively small cone will do the work which formerly required a large cone, thus saving installation space and obviating the heavy construction which a large cone requires.

Another object of my invention is the elimination of moving parts from the thickener so that the separated materials are not stirred up.

Another object of my invention is to eliminate the stagnant areas in the thickener and to induce a uniform flow so that all parts of the thickener are effective in producing a separation.

Another object is to avoid producing a flow of the liquid suspension across the edges of baffles, thereby reducing turbulence in the thickener and increasing the efficiency of the separation.

Another object of my invention is to provide a thickener wherein the liquid may escape freely and readily after the solid materials have been removed therefrom.

My invention, in its preferred form, contemplates the use of a tank which is of conical form with its apex down. The outlet for the concentrated materials is at the bottom in the apex of the cone. The inlet for the material-laden liquid is in the center of the top of this cone. The outlets for the clarified liquid are in the top of the tank and are disposed in a plurality of radial series, with each outlet having a tubular nozzle which is adjustable and which normally extends a short distance above the top of the tank. The outer periphery of the tank, at the top thereof, is provided with an overflow trough for conveying away the clarified liquid.

Within the tank and extending downwardly from the top thereof is a plate which is curved to form spaced convolutions of spiral horizontal cross section and which serves to form a continuous convolute passageway leading from the center of the tank to the outer wall thereof. This plate progressively inclines downwardly towards the center of the tank to provide an inclined continuous shelf. This plate also progressively increases in depth so that its lower edge is of helical form. However, the plate is of such depth and inclination that the continuous passage is open at all parts of its lower end. This opening at the lower end is preferably restricted by a vertical bar or tube passing downwardly through the center of the convolute.

In my preferred method of operation, I deliver the material-laden liquid into the tank through the central opening in the top thereof and continue this delivery with the clarified liquid escaping through the outlets in the top of the tank and delay withdrawal of the solids which are deposited from the material-laden liquid until the bottom opening of the convolute passageway is covered and closed by such deposited solids. Then the operation is continued with the material-laden liquid passing into the center of the tank and traveling a combined spiral and helical path along the convolute shelf. The solids settle on such shelf and progressively slide to the center, being withdrawn from the bottom of the tank intermittently or continuously as desired. Simultaneously, the clarified liquid rises to the top and overflows through the nozzles which are adjusted as desired, the liquid then being delivered to the surrounding trough.

The preferred apparatus which I use and certain modificatoins thereof are shown in the accompanying drawings wherein similar characters of reference designate corresponding parts and wherein.

Figure 1:
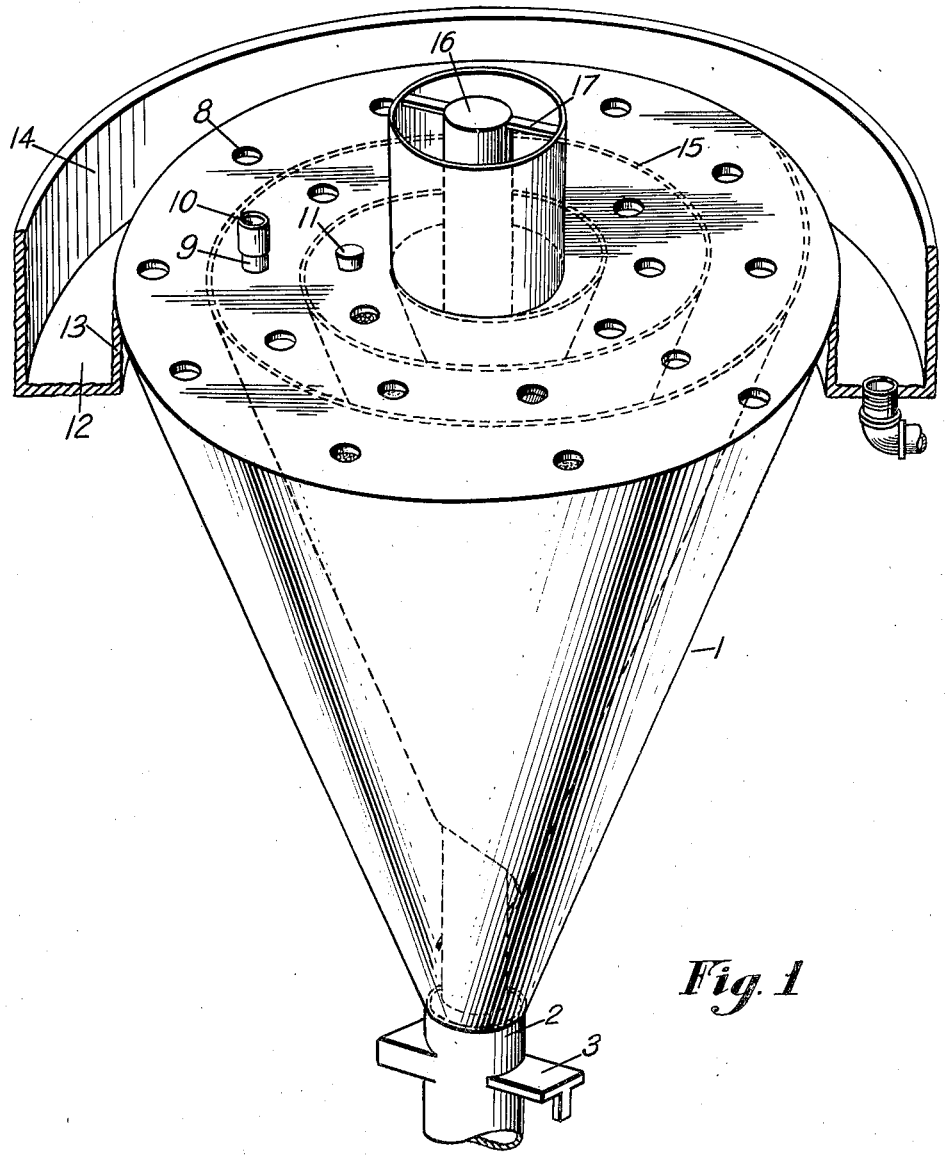
Figure 1 is a perspective view of my preferred type of apparatus with the overflow trough shown in section and with the remainder of the apparatus shown transparent to facilitate understanding thereof.
Figure 2:
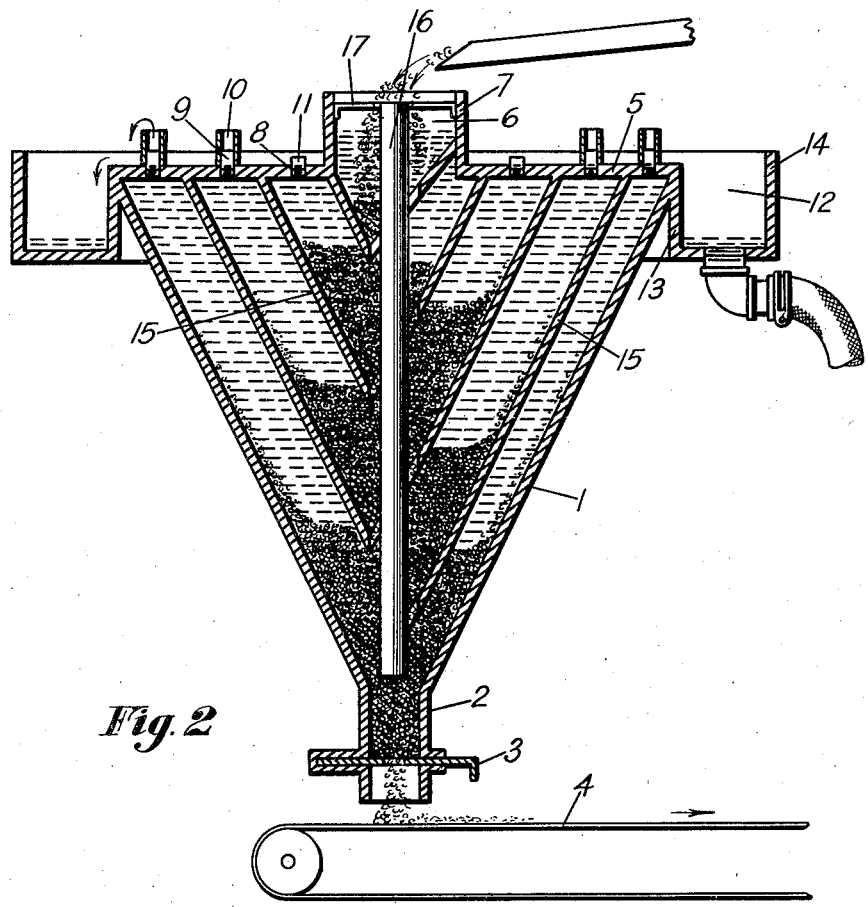
Figure 2 is a vertical sectional view of the apparatus shown in Figure 1 and illustrating one condition of operation during which the solids are being separated from the liquid.
Figure 3:
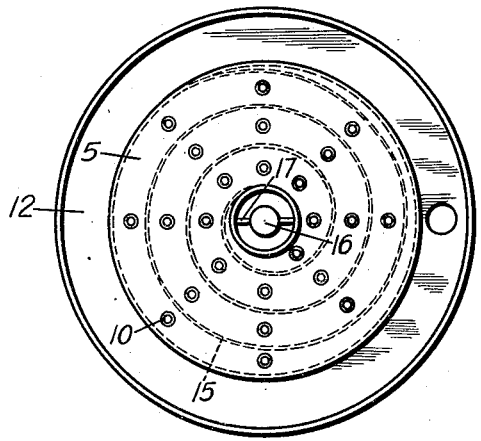
Figure 3 is a top plan view of the structure shown in Figure 1.

In the drawings, referring particularly to Figures 1, 2 and 3, it will be seen that I have provided a tank 1 which is substantially in the form of an inverted cone. This conical tank is provided at its apex or lower end with an outlet 2 through which the depositing solids may be withdrawn as desired. An apertured slide valve 3 for controlling the outlet and a conveyer belt 4 for carrying away the solids are shown. It will be understood, however, that this outlet may be controlled in various ways and that the material may be withdrawn either continuously or intermittently and carried away by any suitable type of conveyer.

The upper end of this conical tank 1, in the form shown, is closed as at 5 but is provided with a central opening 6 surrounded by an upstanding flange 7 which forms a well into which the material-laden liquid may be delivered. The top 5 is further provided with a plurality of radial series of overflow openings 8 which are preferably provided with tubular nozzles 9 having adjustable collars 10. These collars may be adjusted by sliding up and down to regulate the overflow from any nozzle, to insure that the liquid being delivered therefrom is clean. As indicated at 11, any one or more of the nozzles may be removed and a plug substituted therefor.

Carried upon the outer periphery of the conical tank 1, at the upper edge thereof, is an overflow trough 12. This overflow trough 12 has its inner wall 13 terminating in the same plane with the top of the tank 1. Its outer wall 14 extends to a somewhat higher point and, in fact, to any height desired for any given depth of overflow upon the top of the tank.

Within the conical tank 1, there is provided a plate or shelf 15 that is preferably continuous and it preferably has a smooth upper surface. This plate 15 may be suspended from the top of the tank or otherwise supported. In any event, it should be noted that the plate is wound upon itself to form spaced convolutions, with the inner end of the plate located at one side of the vertical center of the tank and relatively close thereto and with the other end of the plate terminating at the outer wall of the tank. As indicated in Figures 1 and 3, a plan view of the upper edge of this plate gives it the appearance of a spiral which forms a convolute continuous passageway from an area adjacent the center of the tank to the outer-wall thereof.

It will be noted, however, that this convolute plate is, at practically all parts thereof, inclined inwardly and downwardly towards the vertical center of the conical tank. It will likewise be noted, particularly by reference to Figure 1, that the inner end of this plate is of relatively slight depth and that it progressively increases in depth as it approaches the outer wall of the tank so that, by the time it reaches this outer wall of the tank, it is almost equal in depth to the tank. In other words, the lower edge of this convolute plate pursues a helical course downwardly from a point adjacent the top vertical center of the tank to the outer wall of the container at a point adjacent the lower edge of this said outer wall.

It should also be noted that this convolute plate or shelf is sharply inclined and that all of the convolutions thereof extend downwardly and inwardly to points which are comparatively close to the vertical axis of the conical tank.

At its vertical center, the tank is provided with a rod or tube 16 which is supported adjacent the top of the well 7, as at 17, and which extends approximately to the upper end of the tubular outlet 2. Inspection of Figure 2 will show that this rod or tube 16 has its outer surface in close proximity to the lower edge of the convolute plate 15 at all points, with the result that the outlet from the lower end of the convolute continuous passageway is materially restricted at substantially all points.

In the preferred method of operating this apparatus, the material-laden liquid is delivered into the well 7 until the conical tank 1 is filled therewith and the overflow is controlled until the deposited solids fill the restricted passages between the central tube or rod 16 and submerge the lower edge of the convolute plate. Continued operation under these conditions assures that the material-laden liquid will travel from the point of entrance in a continuous path with combined spiral and helical components of motion over the continuous convolute plate or shelf. As this movement progresses, the solids will be deposited upon said plate or shelf. The overflow outlets immediately adjacent the central well 7 may be maintained closed with some types of suspensions, since there may be no clear liquid by the time it reaches these overflow outlets. However, as the liquid continues to travel, the clarified liquid overflows through the outlet nozzles 9 and their collars 10. These collars may be variously adjusted to regulate the amount of overflow or to render some of them sufficiently high to preclude overflow with a given head in the central well 7. With these various adjustments, it is possible to assure the attainment of a relatively clean overflow. The solids which are deposited upon the upper surface of the convolute plate slide downwardly to the vertical center of the apparatus and are withdrawn either intermittently or continuously through the outlet 2. Maintaining the restricted passages between the central tube or rod 16 and the lower edge of the convolute plate prevents the material-laden liquid from passing directly downward and around the lower edge of the plate, which would result in an incomplete travel of some of the liquid over the deposit surface area and which would tend to create eddy currents as this liquid moves across the edge of the convolute plate.

Figure 4:
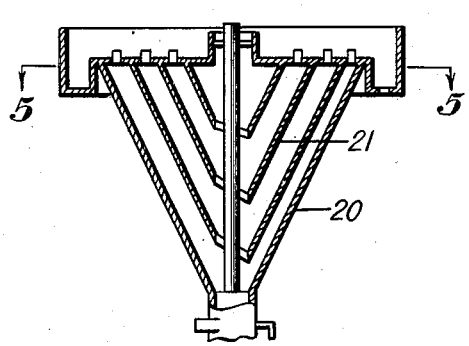
Figure 4 is a vertical section of a modified form of my apparatus wherein the tank and trough are rectangular in horizontal section and the convolutions of the plate and continuous passageway are angular in form.
Figure 5:
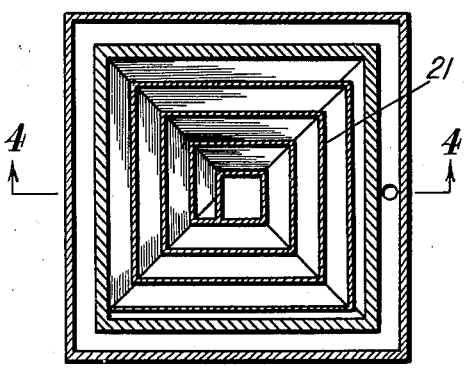
Figure 5 is a section taken on line 5—5 of Figure 4.

The modified form of apparatus which I have shown in Figures 4 and 5 is substantially identical in principle of operation with that shown in Figures 1, 2 and 3. The structure is also substantially identical, with the exception that the tank 20 is substantially pyramidal in form and the continuous convolute plate 21 is bent to produce planes and angles. Nevertheless, this convolute plate is also wound upon itself in such a way that a continuous convolute passage is formed from the center of the conical tank to the outer wall thereof.

Figure 6:
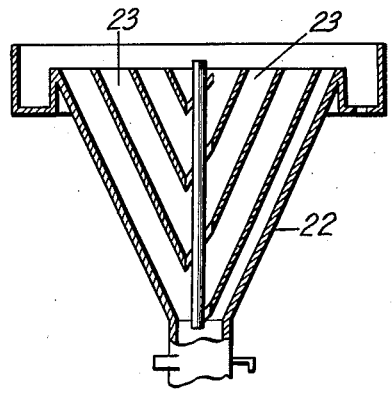
Figure 6 is a vertical section of the modified form of my apparatus, wherein the conical tank is open at the top so that the clarified liquid may freely overflow from the upper end of the continuous passageway.

Figure 6 shows a structure which is substantially identical with that shown in Figures 1, 2 and 3, with the exception that the conical tank 22 is open at the top as indicated at 23. In this form, no overflow nozzles are provided.

Figure 7:
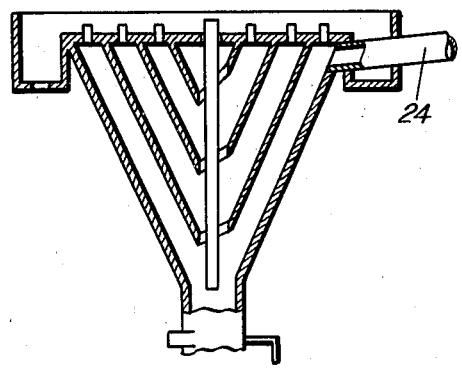
Figure 7 is a vertical section of a modified type of apparatus which I may use, wherein the water is delivered tangentially at the outer periphery of the tank and permitted to travel the continuous passageway with the solids being deposited on the plate or shelf and with the clarified liquid being delivered through the overflow nozzles in the top of the tank.
Figure 8:
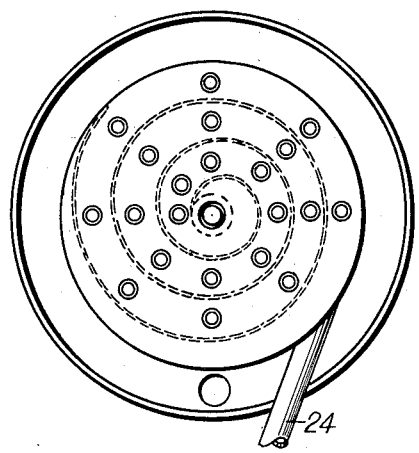
Figure 8 is a plan view of the structure shown in Figure 7.

Figures 7 and 8 constitute a further modification of my apparatus so that the material-laden liquid may be fed to it from the outer periphery and passed inwardly to the center of the tank.

Thus, it will be seen that I have provided a tangential inlet pipe 24 which delivers the material-laden liquid into the conical tank at the outer edge and adjacent the top thereof. The arrows shown in Figure 8 illustrate the path of flow of this material-laden liquid.

Obviously, the method of operation of my apparatus may be varied to some extent. For example, it is not absolutely necessary that the restricted space between the central post or tube and the convolutions of the plate or shelf be covered with the deposited solids. Although this is desirable, for reasons indicated above, the apparatus may be operated to advantage while permitting some short circuiting around the lower edge of the convolute plate.

It is equally obvious that certain modifications of my apparatus may be made without departing from the spirit of my invention. For example, the central tube or post may be dispensed with. However, if this is done, the convolute plate should be so constructed that its lower edge more nearly approaches the vertical axis of the conical tank.

It will likewise be apparent that many modifications of the structure of the convolute plate or shelf are possible. For example, it is not absolutely necessary that the plate be formed in one piece or that its convolutions form an exact spiral in horizontal cross section. Neither is it entirely necessary that the upper surface of this convolute plate or shelf be entirely smooth throughout its area, though this is desirable. The requirements of construction may necessitate irregularities, although it should be remembered that these should be such that turbulence will be avoided as far as possible.

The angle of inclination of the convolutions of this plate or shelf as well as the interior surface of the conical tank should be such that the deposited material will freely slide downwardly to the approximate vertical center of the tank. Obviously, the type of material-laden liquid being treated may alter this angle of inclination to some extent.

It should also be understood that the spaces between the convolutions of the plate and the space between the outermost convolution thereof and the inner wall of the conical tank may be varied considerably. Thus, some of the adjacent convolutions may be closer together than other adjacent convolutions or some parts of the convolute plate may have different angles of inclination than others. In other words, variations in form of the convolute passageway are possible without departing from the spirit of my invention.

It will be apparent that my method and apparatus have numerous advantages. The operation is continuous. The use of the continuous convolute plate or shelf greatly increases the available deposit surface for a given size tank and at the same time decreases the distance through which the suspended particles must fall before encountering such a surface. The apparatus comprises no moving parts and is simple in operation. The liquid flows in a continuous path over a prolonged deposit surface and at no place does it impinge upon this surface in such a way as to induce turbulence or decrease the efficiency of separation.

Another important feature of my process and apparatus is that it overcomes certain important drawbacks found in many prior art devices. For instance, in some of such prior art devices, the falling particles are met by countercurrents of the liquid which, to a substantial extent, interfere with the separating action. My process and apparatus are such that this undesirable feature is eliminated with a consequent increase in efficiency.

Likewise, certain of the prior art devices are rendered less efficient because of the fact that the points of discharge of the solids and the clear liquid, and more particularly of the solids, are undesirably close to the point at which the material-laden liquid initially enters the separating apparatus. The efficiency of my process and apparatus is greatly enhanced as a result of the fact that the points of discharge of the solids and the clear liquid are far removed from the point at which the material-laden liquid enters the apparatus.

An important feature of my invention arises from the fact that, in the preferred form of my process and apparatus, wherein the material-laden liquid is delivered at the axis of the conical tank, the liquid so delivered passes into a continuous convolute passage which becomes progressively larger. This results in a progressively decreasing velocity of the liquid with a consequent increase in efficiency in the separating action.

The method of removing the overflow has particular advantages. The liquid is removed from the conical tank progressively as soon as it is clarified. Consequently, the volume of the suspension to be dealt with is constantly reduced as it moves along the convolute passage. This results in a progressive reduction of the rate of travel of the liquid, so that extremely low velocities are attainable and a maximum time is available for the separation.

It will also be apparent that the use of this continuous convolute plate or shelf and the method of removing both the solids and the clarified liquid prevent the formation of extensive dead areas or zones within the tank, such as are prevalent in some of the prior art thickeners. Such dead areas or zones are effective in slowing up the thickening operation. An important advantage of my invention results from the fact that all parts of the apparatus are effective in the separating process and that no dead areas or zones are possible.

The gain in efficiency over prior art separators is remarkable. For example, tests which I have run indicate that my process and apparatus will separate from 5 to 10 times as much material-laden liquid as a standard cone thickener of the same volume and, at the same time, will produce a separation of the solids and an overflow of the same quality.

Numerous other advantages will be apparent from the description and the appended claims.

Having thus described my invention, what I claim is:

1. The method of separating solids from liquid suspensions thereof which comprises delivering the material-laden liquid into the upper portion of a container having a plate which curves around the axis of the container and which is inclined downwardly and inwardly towards such axis, withdrawing the clarified liquid at a point or points adjacent the upper end of the container at such a rate relative to the rate of delivery of the material-laden liquid into the container that the material-laden liquid will travel over said plate with sufficient slowness to permit settling of some or all of the particles of material onto said plate so that said particles will slide downwardly along said plate toward a point of withdrawal, and withdrawing the particles thus accumulated from the lower part of the container.

2. The method of separating solids from liquid suspensions thereof which comprises delivering the material-laden liquid into the upper portion of a container having a plate-like structure therein constructed to direct such material-laden liquid in a convolute path around the axis of the container and which plate-like structure is inclined downwardly and inwardly towards such axis, withdrawing the clarified liquid at a point or points adjacent the upper end of the container at such a rate relative to the rate of delivery of the material-laden liquid into the container that the material-laden liquid will travel over said plate-like structure with sufficient slowness to permit settling of some or all of the particles of material onto said plate-like structure so that said particles will slide downwardly along said plate-like structure towards a point of withdrawal, and withdrawing the particles thus accumulated from the lower part of the container.

3. The method of separating solids from liquid suspensions thereof which comprises delivering the material-laden liquid into the upper portion of a container having a plate-like structure therein constructed to direct such material-laden liquid in a convolute path around the axis of the container and which plate-like structure is inclined downwardly and inwardly towards such axis, withdrawing the clarified liquid at a point or points adjacent the upper end of the container at such a rate relative to the rate of delivery of the material-laden liquid into the container that the material-laden liquid will travel over said plate-like structure with sufficient slowness to permit settling of some or all of the particles onto said plate-like structure so that said particles will slide downwardly along said plate-like structure towards a point of withdrawal, and withdrawing the accumulated particles from the lower part of the container continuously while introducing the material-laden liquid thereinto.

4. The method of separating solids from liquid suspensions thereof which comprises delivering the material-laden liquid into the upper portion of a container having a plate-like structure therein constructed to direct such material-laden liquid in a convolute path around the axis of the container and which plate-like structure is inclined downwardly and inwardly towards such axis, withdrawing the clarified liquid progressively as the particles settle therefrom at a point or points adjacent the upper end of the container at such a rate relative to the rate of delivery of the material-laden liquid into the container that the material-laden liquid will travel over said plate-like structure with sufficient slowness to permit settling of some or all of the particles onto said plate-like structure so that said particles will slide downwardly along said plate-like structure towards a point of withdrawal, permitting such delivered particles to cover the lower edge of said plate-like structure and to substantially close the relatively restricted passageway at the bottom of the axial center of the plate-like structure and withdrawing part of the accumulated particles from the lower part of the container.

5. A device for separating solids from liquid suspensions thereof comprising a container having an inlet for the material-laden liquid and an outlet or outlets for the clarified liquid adjacent the upper end thereof, and means within said container for conducting the inflowing material-laden liquid around the axis of said container in a substantially convolute direction, said means comprising a plate-like structure having spaced surfaces which conduct the liquid in a convolute path for receiving the settling particles which is inclined towards the axis of the container so that the particles received thereon will slide towards such axis, said plate having all its upper edges in substantially the same horizontal plane and means permitting withdrawal of the accumulated particles from said container adjacent the lower end thereof.

6. A device for separating solids from liquid suspensions thereof comprising a container having an inlet for the material-laden liquid and an outlet or outlets for the clarified liquid adjacent the upper end thereof, and means within said container for conducting the inflowing material-laden liquid around the axis of said container in a substantially convolute direction, said means comprising a convolute plate-like structure which increases in depth progressively for receiving the settling particles and which plate-like structure is inclined towards the axis of the container so that the particles received thereon will slide towards such axis, said convolute plate having all its upper edges in substantially the same horizontal plane, and means permitting withdrawal of the accumulated particles from said container adjacent the lower end thereof.

JOHN G. ATTWOOD.